A. ERICKSON.
PLOW STRUCTURE.
APPLICATION FILED OCT. 2, 1913.

1,129,859.

Patented Mar. 2, 1915.

Witnesses:
W. L. Dow.
John F. McCanna Jr.

Inventor:
Andrew Erickson
By A. O. Behel
Atty.

UNITED STATES PATENT OFFICE.

ANDREW ERICKSON, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW STRUCTURE.

1,129,859.      Specification of Letters Patent.      Patented Mar. 2, 1915.

Application filed October 2, 1913. Serial No. 793,003.

*To all whom it may concern:*

Be it known that I, ANDREW ERICKSON, a citizen of the United States, residing at Rockford, in the county of Winnebago and the State of Illinois, have invented certain new and useful Improvements in Plow Structures, of which the following is a specification.

This invention relates to "quick-detachable" shares for moldboard plows, and has for its object the provision of such a share having simple and efficient attaching means for detachably connecting the share to the frog and moldboard.

Figure 1:
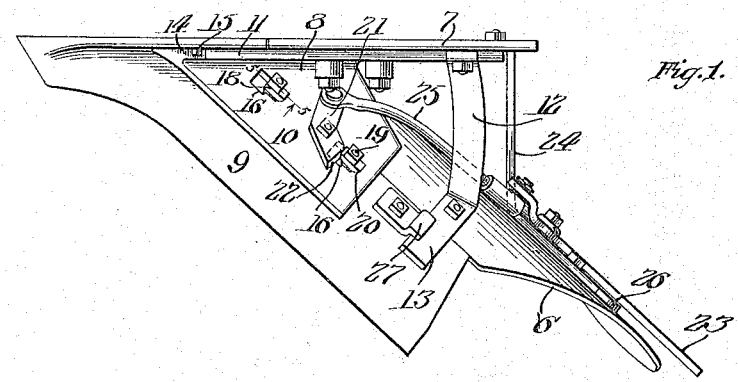
Figure 2:
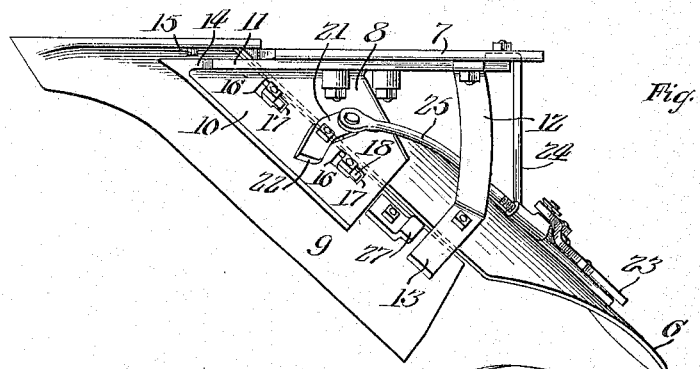
Figure 3:
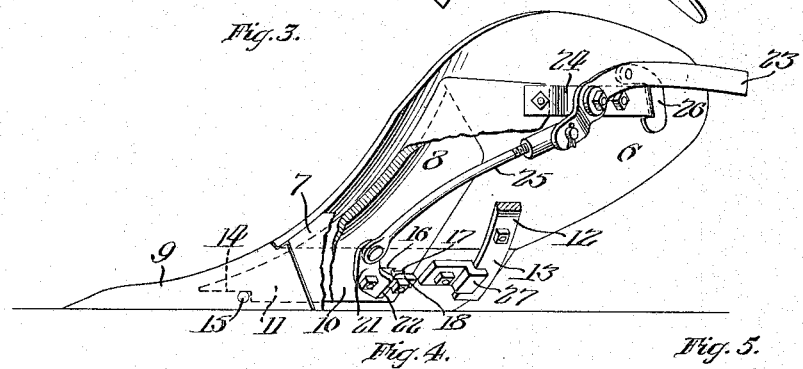
Figure 4:
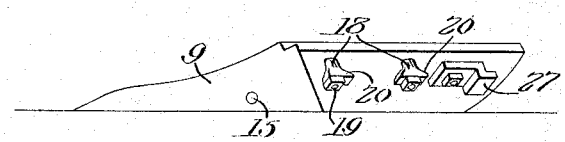
Figure 5:
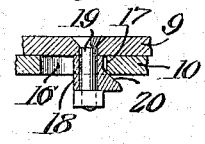

In the accompanying drawings: Figure 1 is a view looking at the bottom of a moldboard plow, embodying my improvements. Fig. 2 is a similar view but with the share clamping means in unlocked position and the share moved in position to be detached. Fig. 3 is a view of the plow in a working position and looking at the landside thereof, a portion of the landside and frog being broken away. Fig. 4 is a view of the share detached and positioned similar to the share in Fig. 3. Fig. 5 is a detail section through one of the engaging lugs, taken substantially on the section line 5—5 of Fig. 1.

The plow in itself is of the general moldboard type, having a moldboard 6, landside 7, frog 8 and share 9.

The frog connecting the moldboard and landside fixedly together has extending portions 10 and 11 adjacent the moldboard and landside, respectively, to which the share may be connected. A brace 12 between the moldboard and landside has an end 13 extending beyond the lower edge of the moldboard and serves as additional means through which the share is attached in position. The share 9 is in fitting engagement with the moldboard and landside; and the V-shaped lower portion of the frog extends fittingly beneath the point portion of the share and has a holding face 14 with which the lug 15 carried by the share engages, so as to hold the plow point from being raised and displaced from position. The extension 10 of the frog is provided with two openings 16 having reduced engageable sides 17; and share extensions in the shape of lugs 18 held fixed to the share by bolts 19, are disposed in said openings 16 and are provided with beveled engaging faces 20 (Fig. 5) which are adapted to engage the edges 17 of the reduced openings in a frictionally compressing manner. Lever clamping means are provided for holding said engaging lugs locked with the frog faces 17, and comprise, a clamping member 21 pivoted intermediate its ends to the frog extension 10 and having a cam-faced end 22 adapted to be moved into contact with a lug 18, a hand lever 23 pivoted intermediate its ends to a brace 24 connecting the moldboard and landside, an adjustable link 25 connecting ends of the clamping member and hand lever, and a catch 26 pivoted to the hand lever 23 for engaging an end of brace 24 and holding said lever in a locked position. An offset extension 27 fixed to the under side of the heel end of the share is adapted to engage the extending end 13 of the brace 12.

Assuming the share to be detached, to attach same to the plow the share is positioned with the engaging lugs 18 located in openings 16; (as shown in Fig. 2,) and when said lugs have been thus inserted, the share is moved bodily in the direction toward the reduced ends 17 of said openings, thus engaging in a compressing manner edges of the frog between the share and frog associated side and the beveled faces 20 of said lugs, and also engaging the lug 15 with the face 14 of the frog, and the members 27 and 13. Assuming that the plow and share is now in its upright working position, the hand lever 23 will be in a raised position, and by moving said hand lever downward the cam-face 22 of the clamping member 21 will be swung into engagement with a lug 18 and force the share toward the reduced ends 17, so that a great compressing engagement is resultant between the beveled faces of the lugs and faces of the frog, thereby holding the share fixed rigidly with the frog; and by engaging the catch 26 the clamping means will be locked in their clamped position. It will be noticed that these means provide necessary requisite for securely and substantially attaching the share to the frog or moldboard, there being means for securing the point portion of the share, the heel portion of the share, and for locking fixedly the intermediate portion of the share with the plow structure; and that these means are simple in construction and operation. Further, their manner of being engaged is without the use of any removable bolts or parts, and all three means are engaged simultaneously upon the movement of the share in one direction. Such a means enables a share to be easily and "quickly" detached in the true sense of the word, and yet, when locked in position it serves as a most substantial connection for securing the share.

I claim as my invention:

1. In a plow, the combination of a frog provided with a plurality of locking slots and a forwardly projecting holding face, a moldboard fixed to said frog, a brace connected to the rear end of said frog and to the moldboard and extending downwardly beyond the lower edge of said moldboard, a plow share having a pin positioned to engage beneath said holding face, a plurality of lugs constructed to be engaged in said locking slots and having inclined engaging faces for gripping the edges of said slots and a rearwardly projecting member adapted to engage the downwardly extending end of said brace, a clamping member pivoted on said frog in position to be engaged with one of said lugs for preventing disengagement of the lugs from said slots, a lever pivoted on said moldboard, a link connecting said lever with said clamping member, and a latch for holding said lever in locking position.

2. In a plow, the combination of a frog provided with a plurality of locking slots and having a forwardly projecting finger, a moldboard, a share provided with a pin adapted to engage beneath said finger and having a plurality of lugs having undercut inclined rear walls adapted to interlockingly engage in said slots, a member pivoted on said frog in position to be engaged with one of said lugs to hold the lugs against movement in their respective slots, and a manually operated lever for actuating said clamping member.

3. In a plow, the combination of a frog provided with a plurality of locking slots, a moldboard, a brace projecting beneath the lower edge of said moldboard, a plow share provided with a pair of lugs having inclined faces adapted to engage with the walls of said slots, said share being also provided with a rearwardly projecting member adapted to engage with the downwardly extending end of said brace, a pivotally mounted clamping member adapted to prevent disengagement of said locks from said slots, a manually operated lever for actuating said clamping member, and means for locking said lever.

In testimony whereof I have hereunto set my hand in presence of two subscribing witnesses.

ANDREW ERICKSON.

Witnesses:
R. A. HEMENWAY,
A. O. BEHEL.

Copies of this patent may be obtained for five cents each, by addressing the "Commissioner of Patents, Washington, D. C."